US007540055B1

(12) United States Patent
Bailey

(10) Patent No.: US 7,540,055 B1
(45) Date of Patent: Jun. 2, 2009

(54) CLEANING CARDS FOR INTERNAL SURFACES OF MACHINE COMPONENTS

(75) Inventor: Glen Alan Bailey, Minot, ME (US)

(73) Assignee: Enefco International, Inc., Auburn, ME (US)

( * ) Notice: Subject to any disclaimer, the term of this patent is extended or adjusted under 35 U.S.C. 154(b) by 773 days.

(21) Appl. No.: 11/151,950

(22) Filed: Jun. 14, 2005

(51) Int. Cl.
*A47L 13/00* (2006.01)
*B32B 1/00* (2006.01)

(52) U.S. Cl. .................. 15/210.1; 15/104.001; 428/174

(58) Field of Classification Search ................ 15/209.1, 15/210.1, 104.001; 428/174
See application file for complete search history.

(56) References Cited

U.S. PATENT DOCUMENTS

| | | | | |
|---|---|---|---|---|
| 1,851,811 | A * | 3/1932 | Christie | 15/104.93 |
| 4,357,615 | A * | 11/1982 | Yoshiharu et al. | 346/134 |
| 5,153,964 | A | 10/1992 | Gelardi et al. | |
| 5,457,843 | A | 10/1995 | Gelardi et al. | |
| 5,525,417 | A | 6/1996 | Eyler | |
| 5,824,611 | A | 10/1998 | Eyler | |
| 5,832,556 | A | 11/1998 | Eyler | |
| 5,878,458 | A | 3/1999 | Higginbotham | |
| D420,658 | S | 2/2000 | Eyler | |
| 6,107,221 | A | 8/2000 | Nakajima et al. | |
| 6,156,407 | A | 12/2000 | Neubauer et al. | |
| 6,210,490 | B1 | 4/2001 | Michael et al. | |
| 6,243,908 | B1 | 6/2001 | Battle et al. | |
| 6,353,233 | B1 | 3/2002 | Kikuchi et al. | |
| 6,611,985 | B1 | 9/2003 | Neubauer et al. | |
| 2005/0266211 | A1 | 12/2005 | Klein et al. | |
| 2006/0019072 | A1 | 1/2006 | Bailey et al. | |

FOREIGN PATENT DOCUMENTS

| | | |
|---|---|---|
| WO | PCTUS0623192 | 6/2006 |

* cited by examiner

*Primary Examiner*—Randall Chin
(74) *Attorney, Agent, or Firm*—Caesar, Rivise, Bernstein, Cohen & Pokotilow, Ltd.

(57) ABSTRACT

A cleaning card for use in cleaning internal surfaces of machine components includes a substrate having a central plane between opposed surfaces thereof, a machine direction dimension defined between opposed leading and trailing end edges and a transverse direction dimension defined between opposed side edges. The opposed surfaces each have a plurality of discrete raised areas, each including a peak and an inclined peripheral leading wall including an edge remote from the peak. The peak of each raised area is further from the central plane than the edge of the inclined peripheral leading wall remote from the peak and leading walls of a plurality of discrete raised areas have edges defining openings therein for assisting in removing debris from the machine components.

27 Claims, 1 Drawing Sheet

CLEANING CARDS FOR INTERNAL SURFACES OF MACHINE COMPONENTS

FIELD OF THE INVENTION

This invention relates generally to cleaning cards and more specifically to cleaning cards having the capability of cleaning internal surfaces of machine components. More specifically, this invention relates to cleaning cards capable of removing debris from closely spaced apart internal surfaces of machine components, e.g., closely spaced-apart surfaces of a thermal printing head and an aligned, closely spaced support platen in thermal printers.

BACKGROUND ART

Cleaning cards for cleaning a variety of internal surfaces of machine components are well known in the art. Such cleaning cards have been employed to clean internal machine-actuating mechanisms of the type intended to receive an operating card or other machine-operating substrate (e.g., paper currency) for actuating the operation of a machine.

The most common commercially available cleaning cards are substantially flat substrates that are intended to closely approximate the dimensions of the machine-operating substrate (e.g., credit card, paper currency, pass including magnetic stripe for actuating subway turnstiles, hotel door locks, etc.) so that they can be received in the same slot as the machine-operating substrate for the purpose of cleaning internal machine components. However, in a number of machine-operating devices internal surfaces to be cleaned are spaced further apart than the maximum thickness of a cleaning card adapted to be received in the device. To deal with this problem cleaning cards have been designed with collapsible, raised surfaces for cleaning or removing foreign objects from such internal surfaces, as is exemplified by the disclosures in U.S. Pat. Nos. 6,243,908 (Battle, et al.), 6,107,221 (Nakajima, et al.) and 5,153,964 (Gelardi, et al.). A discussion of these latter three (3) patents is included in application Ser. No. 10/857,382, now pending, the subject matter of which is fully incorporated herein by reference. For purposes of brevity, a discussion of the above-three prior art patents will not be repeated herein.

Suffice it to state that the prior art cleaning card structures, while generally usable for their intended purpose, are not capable of effectively cleaning out certain types of dust particles (e.g., paper dust) that tend to collect, or build up adjacent the trailing edge of closely spaced apart machine components, such as the trailing edges of a thermal printing head and an aligned support platen in thermal printers. Moreover, in thermal printing devices it is not uncommon for debris to actually become burnt onto the print head, due to the inclusion of pressure-sensitive adhesives that commonly are employed in the paper substrates directed through the printing devices. Such burnt-on debris is not consistently removed in an effective manner with the use of conventional cleaning card structures.

In view of the deficiencies in prior art cleaning card structures a need exists for a cleaning card that is capable of effectively and consistently removing paper dust and other debris that tend to build up adjacent trailing edges of closely spaced apart machine components, such as the trailing edges of a thermal print head and an aligned, closely spaced-apart support platen through which paper labels to be printed are directed. In addition, a need exists for an improved cleaning card that also is capable of effectively and consistently removing debris that is burnt onto heated internal components, such as the thermal print head of a thermal printing unit. It is to such improved cleaning card constructions that the present invention is directed.

SUMMARY OF THE INVENTION

The above and other objects of this invention are achieved in a cleaning card for use in cleaning internal surfaces of machine components, wherein the cleaning card includes a substrate having a central plane between opposed surfaces thereof, a machine-direction dimension defined between opposed leading and trailing end edges and a transverse direction dimension defined between opposed side edges. The opposed surfaces of the substrate each have a plurality of discrete raised areas, each including a peak and an inclined peripheral leading wall having an edge remote from the peak. The peak of each raised area is spaced further from the central plane of the substrate than the edge of the inclined peripheral leading wall remote from the peak, and the inclined leading walls of a plurality of the discrete raise areas have edges defining openings therein for assisting in removing debris from the machine components.

Most preferably the cleaning cards of this invention are impregnated with a cleaning solution or solvent, such as alcohol, to assist in trapping debris and removing the debris from internal machine components.

In the preferred structures of this invention each of the plurality of discrete raised areas also includes an inclined peripheral trialing wall having an edge remote from the peak and being closer to the central plane of the substrate than the peak. This provides a beneficial structure permitting the discrete raised areas to easily collapse as they are directed through closely spaced-apart machine components, such as closely spaced-apart, aligned surfaces of a thermal printing head and a support platen in thermal printing units.

In the preferred embodiments of this invention the plurality of discrete raised areas are arranged in a plurality of transversely extending rows, with at least some of the discrete raised areas in at least some of the transversely extending rows extending outwardly on each side of the central plane of the substrate. Most preferably the leading walls having edges that define the openings therein extend outwardly on each side of the central plane, to thereby assist in removing debris adjacent opposed, closely-spaced machine components.

In the preferred embodiments of this invention, leading walls of discrete raised areas extending outwardly on each side of the central plane of the substrate have openings therein, and openings extending outwardly on the same side of the central plane and being located in adjacent transversely extending rows of discrete raised are transversely staggered to partially overlap each other in the transverse direction, whereby most of the transverse extent of machine components to be cleaned will be engaged by edges defining one or more openings in leading walls of the raised areas.

In the preferred embodiments of this invention every other raised area in at least some of the transversely extending rows is on one side of the central plane of the substrate and the other raised areas in said at least some of said transversely extending rows are on the other side of said central plane, whereby the raised areas function to clean away debris from machine components located on both sides of the cleaning card.

In the most preferred embodiment of this invention the raised areas are located in at least three transversely extending rows, and every other raised area in three transversely extending rows is on one side of the central plane of the substrate and the other raised areas in the three transversely extending rows are on the other side of the central plane.

Most preferably the leading and trailing end edges of the cleaning cards have different configurations to thereby visually indicate which end should be gripped by a user for insertion between machine components to be cleaned.

In the preferred embodiments of this invention the raised areas are easily compressible by closely spaced apart opposed machine components to be cleaned, and, most preferably the side margins of the raised areas are separated from the cleaning card substrate by cuts or slits to enhance the formation of the incline peripheral leading walls of the raised areas, to thereby permit edges of the openings in the leading walls to provide an effective scooping or scraping action for collecting dust and other foreign debris that tend to collect both behind and on closely spaced apart machine components.

By arranging the discrete raised areas on both opposed surfaces of the substrate, the cleaning card can be pulled through the machine components with either of the opposed surfaces facing upwardly (or downwardly). In fact, in a common method of cleaning closely spaced apart internal machine components, such as the thermal print head and aligned support platen of thermal printers, the cleaning card is pulled through the gap between the machine components several times to provide the cleaning function, and can actually be rotated about its machine direction axis to present either of the opposed surfaces in either an upward or downward direction.

Reference throughout this application to “effective thickness” means the thickness dimension between planes that are parallel to each other and are tangent to the highest points (e.g., peaks) on opposite sides of the central plane of the substrate.

Reference throughout this application to “nominal thickness” means the thickness of the actual substrate normal to, and between the opposed surfaces of the substrate.

Reference throughout this application to “apex,” “peak,” “apices” or “peaks” refers to the highest location of the discrete raised areas, which unless specifically limited, can be any configuration or shape, e.g., a flat surface, the upper region of a curved surface, a linear edge, etc.

Reference to “upward” and “downward” or words of similar meaning in referring to the position or location of elements/surfaces of the cleaning cards of this invention is intended to refer to the relative position of the elements/surfaces, rather than the absolute position of such surfaces. For example, raised areas of the cleaning card that are upward in one orientation of the cleaning card become downwardly facing when the card is rotated 180 degrees about a central longitudinal axis. Likewise, upon such rotation raised areas that previously were facing downward will become upwardly facing. Reference to such areas being “upward” and “downward” is intended to refer to the relative position of those areas on opposite sides of a central plane of the substrate of the cleaning card.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
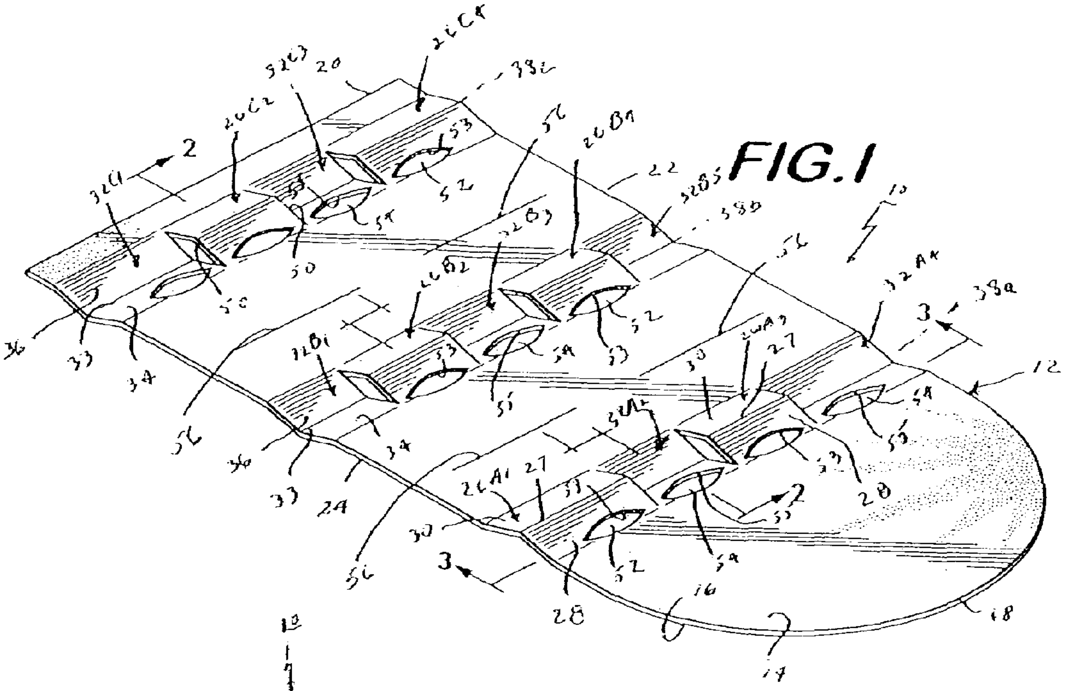
FIG. 1 is an isometric view of a preferred embodiment of a cleaning card in accordance with this invention.
Figure 2:
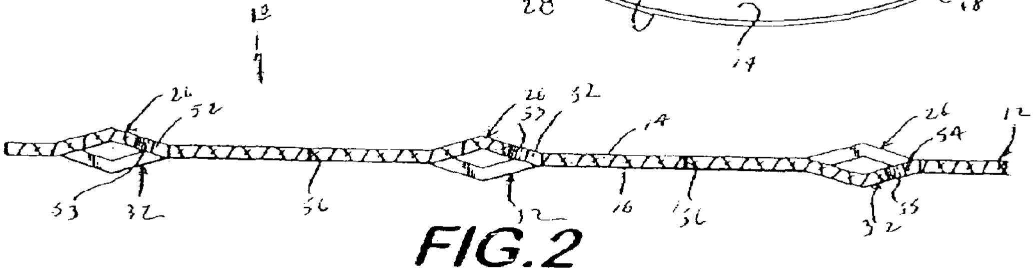
FIG. 2 is a sectional view along line 2-2 of FIG. 1.
Figure 3:
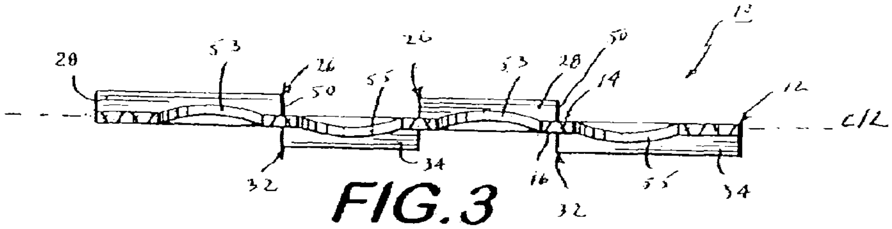
FIG. 3 is a sectional view along line 3-3 of FIG. 1, showing the central plane of the cleaning card substrate by line C/L.

A cleaning card in accordance with a preferred embodiment of this invention is illustrated at 10 in FIGS. 1-4. This cleaning card includes a substrate 12 having a central plane C/L between opposed surfaces 14 and 16 (FIG. 3). In addition, the substrate 12 has a machine direction dimension disposed between a leading edge 18 and a trailing edge 20, and a transverse direction dimension disposed between side edges 22 and 24.

Referring to FIGS. 1-3, the substrate 12 includes discrete raised areas, generally identified by the prefix number 26, on one side of the central plane C/L, each having a peak or apex 27 joined to an incline peripheral leading wall 28 and an incline peripheral trailing wall 30. In addition, the substrate 12 includes a plurality of discrete raised areas, generally identified by the prefix number 32, on the other side of the central plane C/L, each raised area including a peak or apex 33 joined to an inclined leading wall 34 and an inclined trailing wall 36.

As will be referred to and discussed in greater detail later in this application, the suffix letters following the prefix numbers 26 and 32 identify the transverse row in which the respective discrete raised areas 26 and 32 are located (i.e., “A” referring to transverse row 38*a*, “B” referring to transverse row 38*b* and “C” referring to transverse row 38*c*) and the suffix numbers following the suffix letters identify the location of the raised areas in the rows, in the direction from side edge 24 to side edge 22 as viewed in FIG. 1 (i.e., “1” is the first raised area adjacent side edge 24, “2” is the second raised area from side edge 24, etc.). Thus, by way of example, raised area 26A1 identifies the raised area 26 in row 38*a* extending on one side of the central plane and being closest to the side edge 24. Likewise, raised area 32A4 identifies the raised area 32 in row 38*a* extending on the side of the central plane opposite that of 26A1 but being closest to side edge 22. When the discrete raised areas are identified or discussed solely by reference to their prefix numbers 26 or 32, the discussion relates generally to such discrete raised areas 26 or 32, respectively, regardless of their location in a specific transverse row or of their specific location within the row.

As can be seen best in FIG. 1, the discrete areas 26 and 32 are disposed in both the transverse direction and the machine direction of the substrate 12 so as to dispose the discrete raised areas in a plurality of transversely extending rows 38*a*, 38*b* and 38*c* that are spaced apart from each other in the machine direction dimension by substantially planar segments 39 of the substrate 12.

Although in the preferred embodiments the transversely extending rows 38*a*, 38*b* and 38*c* are substantially normal to the opposed side edges 22 and 24, it is within the scope of this invention to orient the transversely extending rows so that they are canted at an angle other than 90° to such opposed side edges. In fact, in accordance with the broadest aspects of this invention it may not be necessary to arrange the discrete raised areas 26 and/or 32 in transversely extending rows of any type. Moreover, if the discrete raised areas are disposed in transversely extending rows, the number of such rows can be varied within in the broadest aspects of this invention. Most preferably the discrete raised areas are disposed in at least three transversely extending rows 38*a*, 38*b* and 38*c*, as shown in FIG. 1.

Referring specifically to FIG. 1, the peripheral leading and trailing walls 28, 30 of each raised area 26 include edges 40, 42, respectively, remote from the peak 27 and joining the inclined leading and trailing walls to a substantially planar segment 39 of the substrate 12.

Likewise, the leading and trailing walls 34, 36 of the discrete raised areas 32 include edges 44, 46, respectively, remote from the peak 33 and joining the inclined leading and trailing walls to a substantially planar segment 39 of the substrate.

Referring to FIGS. 1-3, in the preferred embodiment of the invention each of the transversely extending rows 38*a*, 38*b* and 38*c* is provided by a series of alternating discrete raised areas 26 and discrete raised areas 32. Also, in accordance with the preferred embodiment of this invention, the adjacent discrete raised areas 26 and 32 in each row are separated from each other by slits, or cuts 50 to provide open areas that can assist in entrapping debris during the cleaning of internal machine components. The manner of forming discrete raised areas with slits or cuts therebetween is disclosed in detail in application Ser. No. 10/857,382, now pending, the subject matter of which already has been fully incorporated by reference herein.

As can be seen best in FIG. 1, in the preferred embodiment the discrete raised areas 26 and 32 are disposed in three, transversely extending rows 38*a*, 38*b* and 38*c*; there being two upper raised areas 26 in each row alternating with downwardly extending raised areas 32, as viewed in FIG. 1. An elongate opening 52 is provided in the peripheral leading wall 28 of each of the discrete raised areas 26, and an elongate opening 54 is provided in the leading wall 34 of each of the discrete raised areas 32, except for the leading walls 34 of the discrete raised areas 32B1 and 32B5. However, it clearly is within the scope of the broadest aspect of this invention to vary the number and location of discrete raised areas 26 and 32 that include elongate openings 52, 54, respectively in their corresponding leading walls 28, 34.

Still referring to FIG. 1, each of the elongate openings 52, 54 in the leading end walls 28, 34 of discrete raised areas 26 and 32, respectively, includes a peripheral edge segment 53, 55, respectively, spaced outwardly from the central plane of the substrate 12. These peripheral edge segments function to scoop or scrape debris from machine components to be cleaned, as will be explained in greater detail later hereinafter. Note that in the preferred embodiment, all of the discrete raised areas 26 and 32 in transverse rows 38*a* and 38*c* include elongate openings in leading walls thereof. However, it is within the broadest scope of this invention to vary the number and location of discrete raised areas that include elongate openings in the leading end walls thereof, depending upon the location and size of internal machine components to be cleaned.

Still referring to FIG. 1, the intermediate transversely extending row 38*b* includes two discrete raised areas 26B2, 26B4 extending in one direction from the central plane C/L of the substrate 12 and three discrete raised areas 32B1, 32B3 and 32B5 extending in the opposite direction from the central plane C/L. The discrete raised areas 32B1 and 32B3, which are located adjacent opposed side edges 24 and 22, respectively, of the cleaning card 10 do not include any openings in the inclined leading walls 34 thereof. However, the two upper raised areas 26B2 and 26B4 and the raised area 32B2 between said raised areas 26B1 and 26B2 do include elongate openings 52, 54 in the inclined peripheral leading walls 28 and 34, respectively. These elongate openings also include peripheral edge segments 53, 55 that provide a scraping or scooping action to assist in removing debris from machine components 58, 60, as will be described in greater detail hereinafter. However, it is within the broadest scope of this invention to vary the number and location of discrete raised areas that include elongate openings in the leading end walls thereof, depending upon the location and size of internal machine components to be cleaned.

Still referring to FIG. 1, the substrate 12 includes four slits 56 aligned in two pairs of two slits each. One pair of slits is located in a planar region 39 of the substrate 12 between adjacent rows 38*a*, 38*b* of raised areas, and the other pair of slits is located in a planar region 39 of the substrate between adjacent rows 38*b*, 38*c* of raised areas. These slits 56 provide regions in which the substrate can expand in the longitudinal direction without causing premature flattening of the raised areas 26, 32, prior to such raised areas engaging opposed, internal machine components 58, 60 (FIG. 4) to be cleaned. Such longitudinal expansion can take place as a result of tension being applied to the cleaning card in the machine direction as the cleaning card is being pulled through the machine components 58, 60 to be cleaned. A full disclosure of the benefits in applying slits, such as slits 56 through a cleaning card in regions between rows of raised areas is disclosed in application Ser. No. 10/957,830, now pending, the subject matter of which is fully incorporated by reference herein.

Still referring to FIG. 1, in the preferred embodiment of this invention the discrete raised areas 26 and 32 in the transversely extending rows 38*a*, 38*b* and 38*c* are dimensioned and/or positioned so that the discrete raised areas in adjacent rows 38*a* and 38*b* and in adjacent rows 38*b* and 38*c* are partially transversely offset relatively to each other so that the cut regions or slits 50 in each transverse row are transversely offset from the cut regions or slits in each adjacent transverse row. In this construction, internal surfaces of the machine components 58, 60 to be cleaned will be exposed to surfaces of leading and trailing walls 28 and 30 of discrete raised areas 26 over substantially the entire transverse extent of the substrate 12 that includes discrete raised areas 26 therein, and also to surfaces of leading and trailing walls 34 and 36 of discrete raised areas 32 over substantially the entire transverse extent of the substrate that includes discrete raised areas 32 therein. In other words, in all machine-direction locations of cleaning card 10 a surface of a discrete raised area 26 exists and a surface of a discrete raised area 32 exists. Thus, in the preferred embodiments of this invention there is no continuous machine-direction path occupied only by slits or cuts 50 joining adjacent discrete raised areas 26, 32 in each of the transverse rows 38*a*, 38*b* and 38*c*.

Another very significant benefit in dimensioning and/or positioning the discrete raised areas 26 and 32 so that they are partially offset relative to each other in adjacent transverse rows 38*a* and 38*b*, and in adjacent transverse rows 38*b* and 38*c* is that a substantial portion of the transverse extent of opposed internal machine components 58, 60 to be cleaned by the card 10 will be engaged by a peripheral edge segment 53, 55 of an opening 52, 54 in the leading walls 28, 34 of the raised areas 26 and 32, respectively, to enhance the cleaning ability of the cards. Specifically, as will be explained in greater detail below, the discrete raised areas 26, with the elongate openings 52 in the inclined leading walls 28 thereof function to assist in the removal of dust and other debris that collects behind one of the internal machine components, e.g., 58, and the elongate openings 54 in the peripheral leading walls 34 of the discrete raised areas 32 function to assist in the removal of dust and other debris that collects adjacent the opposed internal machine component, e.g., 60. Although the machine components 58, 60 to be cleaned can be a variety of different machine elements, the cleaning card of this invention has particular beneficial utility in cleaning thermal printing devices, wherein one of the machine components 58 is a thermal cleaning head and the opposed machine component 60 is a support platen for the substrate (e.g., label) to be thermally printed.

By partially, transversely staggering, or offsetting the discrete raised areas 26 in adjacent transverse rows 38*a*, 38*b* and in adjacent transverse rows 38*b*, 38*c*, internal surfaces of a machine component to be cleaned will be exposed to, and actually be engaged by peripheral edge segments of discrete openings 52 in the leading walls 28 over a substantial portion of the transverse extent of such machine component. In a like manner, the peripheral edge segments 55 of openings 54 in the inclined leading wall 34 of the discrete raised areas 32 will engage a substantial portion of the transverse extent of the other of the machine components to be cleaned.

In the illustrated embodiment of this invention, there is a minor transverse segment of the substrate 12 within the transverse dimension defined between the outermost edges of the spaced-apart openings in the spaced-apart raised areas 26A1-32A4, respectively (the edges of the openings closest to side edges 24 and 22, respectively, of the cleaning card 10) in which a longitudinal axis through the card from the leading edge 18 to the trailing edge 20 does not pass through an edge segment 53 of an opening 52 in a raised area 26. Likewise, there are minor transverse segments of the substrate 12 within this same transverse dimension in which a longitudinal axis through the card from the leading edge 18 to the trailing edge 20 does not pass through an edge segment 55 of an opening 54 in a raised area 32.

Referring first to the transverse spacing between openings 52 in raised areas 26, as a longitudinal axis moves from side edge 24 toward side edge 22 it first passes through the elongate opening 52 in raised area 26A1. As the longitudinal axis leaves this latter opening it already is in the opening 52 in raised area 26B2. As the longitudinal axis leaves the opening in raised area 26B2 it already is in the opening 52 in raised area 26C2. However, at the location in which the longitudinal axis leaves the opening 52 in the raised area 26C2 it is not passing through any other opening 52 in any other raised area 26. Rather, the next opening 52 encountered by the longitudinal axis as the axis moves toward the side edge 22 is the opening in raised area 26A3. The longitudinal axis does not enter the opening 52 in raised area 26A3 until it moves out of 26C2, past the slit edge separating 26C2 from 32C3 (which is longitudinally aligned with the slit edge between 32A2 and 26A3) and then into the opening in 26A3. Thereafter, the longitudinal axis enters the opening 52 in raised area 26B4 prior to leaving the opening in raised area 26A3, and enters the opening 52 in raised area 26 C4 prior to leaving the opening in raised area 26B24

Turning now to the transverse spacing between openings 54 in raised areas 32, as a longitudinal axis moves from side edge 24 toward side edge 22 it first passes through the elongate opening 54 in raised area 32C1. However, at the location in which the longitudinal axis leaves the opening 54 in the raised area 32C1 it is not passing through any other opening 54 in any other raised area 32. Rather, the next opening 54 encountered by the longitudinal axis is the opening in raised area 32A2. The longitudinal axis does not enter the opening 52 in raised area 32A2 until it moves out of 32C1, past the slit edge separating 32C1 from 26C2 (which is longitudinally aligned with the slit edge between 26A1 and 32A2) and then into the opening in 32A2. As the longitudinal axis leaves this latter opening in a direction toward side edge 22 it already is in the opening 54 in raised area 32B3. As the longitudinal axis leaves the opening in raised area 32B3 it already is in the opening 54 in raised area 32C3. However, at the location in which the longitudinal axis leaves the opening 54 in the raised area 32C3 it is not passing through any other opening 54 in any other raised area 32. Rather, the next opening 54 encountered by the longitudinal axis is the opening in raised area 32A4. The longitudinal axis does not enter the opening 54 in raised area 32A4 until it moves out of 32C3, past the slit edge separating 32C3 from 26C4 (which is longitudinally aligned with the slit edge between 26A3 and 32A4) and then into the opening in 32A4.

Figure 4:
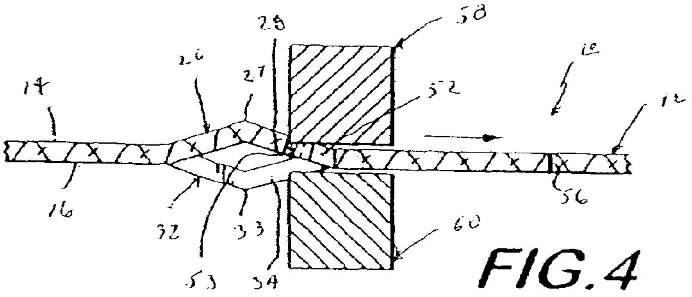
FIG. 4 is a schematic diagram illustrating the manner in which the cleaning card of this invention is employed to clean closely spaced-apart machine components in the cleaning process.

Thus, in a single pass of the cleaning card 10, with the cleaning card in the orientation shown in FIGS. 1 and 4, there is a minor transverse edge segment of one of the machine components 58 to be cleaned that will not be directly contacted by an edge segment 53 of an opening 52 in a raised area 26 and also two minor transverse edge segments of the opposed machine component 60 to be cleaned that will not be directly contacted by an edge segment 55 of an opening 54 in a raised area 32. However, it has been determined that this lack of direct contact between minor transverse edge segment(s) of each of the machine components to be cleaned and an edge segment of an opening in a raised area 26, 32 that engages said machine components does not adversely affect the ability of the card 10 to provide its cleaning function; in particular in connection with cleaning closely spaced surfaces of a thermal printing head and an underlying support platen in a thermal printing unit.

Moreover, the cleaning operation can be carried out by providing multiple passes of the cleaning card 10 through the closely spaced machine components 58, 60; rotating the card about its central longitudinal axis between passes. When the card 10 is rotated about is central longitudinal axis from the position shown in FIG. 1 to a position wherein the raised areas 32 face upwardly and the raised areas 26 face downwardly, the openings in the raised areas 32 will engage the machine component 58 in essentially the same manner that they engaged the machine component 60 prior to rotation; providing two limited transverse segments on the machine component 58 that are not engaged by a peripheral edge 55 of an opening 54 when the card 10 is pulled through the machine components 58,60. Similarly, the raised areas 26 will engage the machine component 60 in essentially the same manner that they engaged the machine component 58 prior to rotation; providing only one limited transverse segment on the machine component 60 that is not engaged by a peripheral edge 53 of an opening 52 when the card 10 is pulled through the machine components 58, 60. Thus, sequentially rotating the card 10 about its central longitudinal axis between multiple passes tends to better distribute the cleaning action provided by peripheral edges 53, 55 of the openings 52, 54, respectively, and the closely spaced-apart machine components 58 and 60.

The manner in which an edge segment 53 of an opening 52 in a raised area 26 of the substrate engages an edge 62 of machine component 58 to scrape debris (e.g., paper dust) from that edge is schematically illustrated in FIG. 4. A similar scraping action takes place between an edge segment 55 of an opening 54 in a raised area 32 of the substrate 12 and an edge 64 of machine component 60. Moreover, when the substrate is flattened, or partially flattened, as it is directed between the closely spaced, opposed surfaces of the machine components 58, 60, the edge segments 53, 55 of the openings 52, 54 aid in scraping debris from one or both of the opposed surfaces and the openings themselves can provide a reservoir for receiving that debris and carrying it out of the machine. Without the provisions of the openings 52, 54 it is extremely difficult to remove paper dust and other debris from confronting edges and/or surfaces of closely spaced-apart machine components, such as the edges and/or surfaces of a thermal printing head and an aligned support platen in a thermal printing device.

EXAMPLE

A representative, non-limiting example of a cleaning card 10 in accordance with this invention includes a substrate 12 having an extruded, central film layer and a spunbond polyester layer applied to both sides of the central film layer while the central layer is still hot. The central film layer can be any desired plastic material, e.g., high density polyethylene, polystyrene, polypropylene, etc. The particular materials making up the components of the substrate 12 do not include a limitation on the broadest aspects of this invention.

A representative cleaning card, in a flat condition before forming the raised areas 26 and 32, has a length of approximately 6.125 inches, a transverse dimension of approximately 3 inches and a leading edge 18 having approximately a 3 inch radius of curvature. Each of the openings 52, 54 includes an elongate dimension of approximately 0.5 inches extending in the transverse direction of the substrate 12, and a narrow dimension of approximately 0.156 inches extending in the machine direction of the substrate 12. The raised areas 26, 32 including the openings 52, 54 therein have a transverse dimension of approximately 0.6425 inches, except for the raised areas 26A1, 32A4, 32C1 and 26C4, which all have a transverse dimension of approximately 0.857 inches. The machine direction distance between the two pairs of slits in the planar sections 39 is approximately 1.75 inches.

It should be emphasized that the dimensions identified in this example are representative examples to provide to those skilled in the art a general idea of the construction of a representative cleaning card in accordance with this invention. This example is by no means considered to be a limitation on the broadest aspects of the invention; the broadest aspects by defined in the appended claims, as construed in accordance with accepted principals of claim construction.

What we claim as our invention is the following:

1. A cleaning card for use in cleaning internal surfaces of machine components, said cleaning card including a substrate having a central plane between opposed surfaces thereof, a machine direction dimension defined between opposed leading and trailing end edges and a transverse direction dimension defined between opposed side edges, said opposed surfaces each having a plurality of discrete raised areas, said discrete raised areas each including a peak and an inclined peripheral leading wall having a remote edge spaced from said peak, said peak of each raised area being further from the central plane than the remote edge of the inclined peripheral leading wall, the leading walls of a plurality of said discrete raised areas having surface regions between the peaks and remote edges, said surface regions including openings therethrough for assisting in removing debris from said machine components.

2. The cleaning card of claim 1, wherein each of said plurality of discrete raised areas also includes an inclined peripheral trailing wall having an edge remote from said peak, said peak being further from the central plane than the edge of the inclined peripheral trailing wall.

3. The cleaning card of claim 2, wherein at least some of said discrete raised areas on each side of said central plane have an underlying recessed area.

4. The cleaning card of claim 2, wherein side margins of at least some of said raised areas are separated from said cleaning card substrate.

5. The cleaning card of claim 4, wherein said raised areas that are separated from said cleaning card substrate are separated by cuts.

6. The cleaning card of claim 1, wherein said plurality of discrete raised areas are arranged in a plurality of transversely extending rows, at least some discrete raised areas in at least some of the transversely extending rows extending outwardly on each side of said central plane of said substrate.

7. The cleaning card of claim 6, wherein surface regions of leading walls including openings therethrough extend outwardly on each side of said central plane.

8. The cleaning card of claim 7, wherein openings in surface regions of leading walls that are located in a plurality of transversely extending rows and extend outward on the same side of said central plane are transversely staggered to overlap each other in said transverse direction.

9. The cleaning card of claim 7, wherein every other raised area in at least some of the transversely extending rows is on one side of the central plane and the other raised areas in said at least some of said transversely extending rows are on the other side of said central plane.

10. The cleaning card of claim 7, wherein said raised areas are located in at least three transversely extending rows, every other raised area in three transversely extending rows is on one side of the central plane and the other raised areas in said three transversely extending rows are on the other side of said central plane.

11. The cleaning card of claim 7, wherein the raised areas in each transversely extending row are transversely offset from the raised areas in adjacent transverse rows.

12. The cleaning card of claim 6, wherein openings in surface regions of leading walls that are located in a plurality of transversely extending rows and extend outward on the same side of said central plane are transversely staggered to overlap each other in said transverse direction.

13. The cleaning card of claim 6, wherein every other raised area in at least some of the transversely extending rows is on one side of the central plane and the other raised areas in said at least some of said transversely extending rows are on the other side of said central plane.

14. The cleaning card of claim 13, wherein the raised areas in each transversely extending row are transversely offset from the raised areas in adjacent transverse rows.

15. The cleaning card of claim 6, wherein said raised areas are located in at least three transversely extending rows, every other raised area in three transversely extending rows is on one side of the central plane and the other raised areas in said three transversely extending rows are on the other side of said central plane.

16. The cleaning card of claim 6, wherein at least some of said discrete raised areas on each side of said central plane have an underlying recessed area.

17. The cleaning card of claim 6, wherein adjacent, transversely extending rows of discrete raised areas are spaced apart from each other in the machine direction by substantially planar sections free of discrete raised areas.

18. The cleaning card of claim 6, wherein side margins of at least some of said raised areas are separated from said cleaning card substrate.

19. The cleaning card of claim 18, wherein said raised areas that are separated from said cleaning card substrate are separated by cuts.

20. The cleaning card of claim 6, wherein the raised areas in each transversely extending row are transversely offset from the raised areas in adjacent transverse rows.

21. The cleaning card of claim 1, wherein surface regions of leading walls including openings therethrough extend outwardly on each side of said central plane.

22. The cleaning card of claim 1, wherein said leading and trailing end edges have different configurations to visually indicate which end should be gripped for insertion between machine components to be cleaned.

23. The cleaning card of claim 1, wherein at least some of said discrete raised areas on each side of the central plane have an underlying recessed area.

24. The cleaning card of claim 1, wherein said raised areas are compressible by opposed machine components to be cleaned.

25. The cleaning card of claim 1, wherein said opposed machine components include a thermal printing head and an underlying platen.

26. The cleaning card of claim 1, wherein side margins of at least some of said raised areas are separated from said cleaning card substrate.

27. The cleaning card of claim 26, wherein said raised areas that are separated from said cleaning card substrate are separated by cuts.

* * * * *